(12) United States Patent
Zhu et al.

(10) Patent No.: US 10,266,272 B2
(45) Date of Patent: Apr. 23, 2019

(54) CATALYTIC OZONE REMOVAL

(71) Applicant: HAMILTON SUNDSTRAND CORPORATION, Windsor Locks, CT (US)

(72) Inventors: Tianli Zhu, Glastonbury, CT (US); Catherine Thibaud, South Windsor, CT (US); Zissis A. Dardas, Worcester, MA (US); Daniel G. Goberman, East Granby, CT (US); Paul E. Hamel, Enfield, CT (US); John G. Sarlo, New Britain, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 0 days.

(21) Appl. No.: 15/238,314

(22) Filed: Aug. 16, 2016

(65) Prior Publication Data
US 2018/0050804 A1    Feb. 22, 2018

(51) Int. Cl.
*B64D 13/06* (2006.01)
*B01J 21/10* (2006.01)
(Continued)

(52) U.S. Cl.
CPC ............ *B64D 13/06* (2013.01); *B01D 53/04* (2013.01); *B01D 53/8675* (2013.01); *B01J 20/02* (2013.01); *B01J 20/04* (2013.01); *B01J 20/041* (2013.01); *B01J 20/06* (2013.01); *B01J 20/226* (2013.01); *B01J 20/3483* (2013.01); *B01J 21/02* (2013.01); *B01J 21/063* (2013.01); *B01J 21/10* (2013.01); *B01J 23/26* (2013.01); *B01J 23/28* (2013.01); *B01J 23/34* (2013.01); *B01J 23/38* (2013.01); *B01J 23/72* (2013.01); *B01J 23/75* (2013.01); *B01J 23/755* (2013.01); *B01J 31/1691* (2013.01); *B01D 2253/1122* (2013.01); *B01D 2253/1124* (2013.01); *B01D 2253/204* (2013.01); *B01D 2255/10* (2013.01); (Continued)

(58) Field of Classification Search
None
See application file for complete search history.

(56) References Cited

U.S. PATENT DOCUMENTS

| 7,037,878 B2 * | 5/2006 | Liu ............... B01D 53/8675 502/240 |
| 7,462,339 B2 | 12/2008 | Galligan et al. |

(Continued)

FOREIGN PATENT DOCUMENTS

| EP | 0467526 A2 | 1/1992 |
| EP | 0829299 A1 | 3/1998 |
| WO | 2010128480 A2 | 11/2010 |

OTHER PUBLICATIONS

Search Report regarding related EP App. No. 17186466.3; dated Nov. 15, 2017; 8 pgs.

*Primary Examiner* — Sheng H Davis
(74) *Attorney, Agent, or Firm* — Cantor Colburn LLP

(57) ABSTRACT

A method is disclosed for removing ozone from a gas. According to this method, the gas is contacted with an adsorbent that includes a transition metal oxide or metal organic framework to form a treated gas. The treated gas is contacted with a noble metal catalyst to catalytically decompose ozone in the treated gas, thereby forming an ozone-depleted treated gas.

7 Claims, 1 Drawing Sheet

(51) Int. Cl.
*B01D 53/04* (2006.01)
*B01J 20/06* (2006.01)
*B01J 20/22* (2006.01)
*B01J 20/34* (2006.01)
*B01J 23/38* (2006.01)
*B01J 20/04* (2006.01)
*B01J 21/02* (2006.01)
*B01J 21/06* (2006.01)
*B01J 23/26* (2006.01)
*B01J 23/28* (2006.01)
*B01J 23/34* (2006.01)
*B01D 53/86* (2006.01)
*B01J 23/72* (2006.01)
*B01J 23/75* (2006.01)
*B01J 23/755* (2006.01)
*B01J 31/16* (2006.01)
*B01J 20/02* (2006.01)

(52) U.S. Cl.
CPC ............ *B01D 2255/207* (2013.01); *B01D 2255/2047* (2013.01); *B01D 2255/2092* (2013.01); *B01D 2255/705* (2013.01); *B01D 2257/106* (2013.01); *B01D 2258/06* (2013.01); *B64D 2013/0685* (2013.01)

(56) References Cited

U.S. PATENT DOCUMENTS

| | | |
|---|---|---|
| 7,828,940 B2 | 11/2010 | Roseberry et al. |
| 2007/0154375 A1 | 7/2007 | Galligan et al. |
| 2009/0010801 A1 | 1/2009 | Murphy et al. |
| 2009/0227195 A1 | 9/2009 | Buelow et al. |
| 2010/0152032 A1 | 6/2010 | Galligan |
| 2015/0118116 A1 | 4/2015 | Buelow et al. |

* cited by examiner

CATALYTIC OZONE REMOVAL

BACKGROUND

This disclosure generally relates to air or other gas treatment, and specifically to catalytic ozone removal.

Ozone is a well-known terrestrial air pollutant, and is also a naturally occurring component of the Earth's atmosphere. Ozone levels in the Earth's atmosphere are known to vary with altitude and seasonally, and aircraft with pressurized cabins that rely on compressed outside air for replenishment of cabin air can experience undesirably high ozone levels in the cabin or other pressurized areas. Ozone concentrations at typical flight cruising altitudes can be significantly higher than the 0.25 ppmv limit set by the FAA for aircraft cabin air. Accordingly, aircraft environmental conditioning systems (ECS) are commonly equipped with equipment for removing ozone from the air.

One technique to remove ozone is to catalytically decompose the ozone molecules to form oxygen molecules according to the reaction represented by the formula:

$$2O_3 \rightarrow 3O_2$$

Catalytic decomposition of ozone can be effective, but the effectiveness can decrease over time. In some cases, the effectiveness of the catalyst can decrease to a level where the catalyst must be replaced. Various technologies have been proposed for catalytic ozone decomposition, such as optimizing the formulation of the catalyst composition; however, there continues to be a demand for new approaches for ozone removal.

BRIEF DESCRIPTION

According to some embodiments of this disclosure, a method is provided for removing ozone from a gas. According to this method, the gas is contacted with an adsorbent comprising a transition metal oxide or metal organic framework to form a treated gas. The treated gas is contacted with a noble metal catalyst to catalytically decompose ozone in the treated gas, thereby forming an ozone-depleted treated gas.

According to some embodiments of this disclosure, an aircraft cabin air system comprises a first air treatment module and a second air treatment module. The first air treatment module comprises an inlet in fluid communication with an air source, an adsorbent comprising a transition metal oxide or metal organic framework, and an outlet. The second air treatment module comprises an inlet in fluid communication with the first air treatment module outlet, a noble metal catalyst and an outlet that discharges ozone-depleted air.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
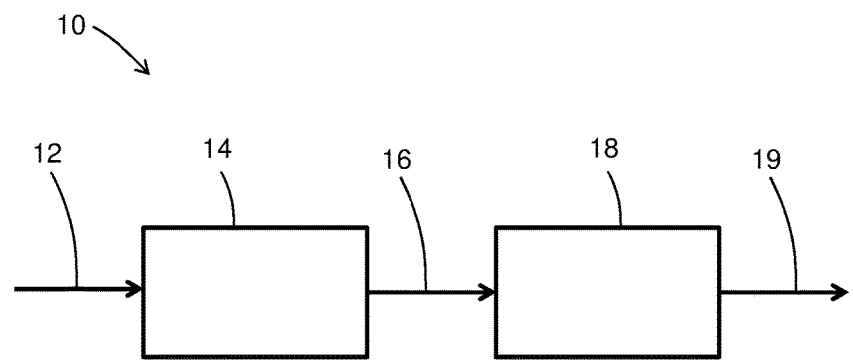
FIG. 1 is a schematic depiction of an example embodiment of an ozone removal system.

With reference now to the Figures, FIG. 1 schematically depicts an example embodiment of an ozone removal system 10. As shown in FIG. 1, a gas 12 to be treated is introduced to an adsorbent module 14. The adsorbent module 14 includes an adsorbent that comprises a transition metal oxide or a metal organic framework. Transition metals for oxide adsorbents include manganese, copper, nickel, cobalt, magnesium, aluminum, titanium, chromium or molybdenum. Examples of transition metal oxide adsorbents include manganese oxide (e.g., $MnO_2$), copper oxide (e.g., CuO), nickel oxide (e.g., NiO), cobalt oxide (e.g., $Co_2O_3$), magnesium oxide (e.g., MgO), and $TiO_2$ or mixed oxides comprising any of the foregoing (e.g., mixed copper-manganese oxide, mixed manganese-cerium oxide, mixed magnesium-aluminum oxide, mixed $MnO_2$—$CeO_2$, mixed $MnO_2$—$ZrO_2$). Many transition metal oxides having a physical configuration (e.g., surface area and porosity parameters) suitable for adsorption of molecular species such as catalyst poisons are commercially available. Transition metal oxides suitable for adsorption can be prepared, for example, by sol-gel techniques known to produce metal oxides having mesoporous (or micro or macroporous) structures that promote adsorptive functionality. In some embodiments, the transition metal oxide adsorbent can also provide catalytic activity for catalytic removal of catalyst poisons, or for catalytic decomposition of ozone itself. Examples of transition metal oxides having catalytic activity include $MnO_2$, $Co_2O_3$, CuO, NiO and MgO. The transition metal oxide(s) can be supported (e.g., dispersed on a high surface area support such as $\gamma$-$Al_2O_3$, $TiO_2$, $SiO_2$, ceria, zirconia, zeolites or activated carbon). The adsorbent module 14 can further comprise a substrate structure such as a zeolite monolith, honeycomb, fibers or corrugated support structure), onto which the adsorbent can be applied (e.g., as a wash coat).

The adsorbent can also comprise a metal organic framework (MOF). Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. Metal organic frameworks are further described by Batten, S R; Champness, N R; Chen, X-M; Garcia-Martinez, J; Kitagawa, S; Ohrström, L; O'Keeffe, M; Suh, M P; Reedijk, J (2013). "Terminology of metal-organic frameworks and coordination polymers (IUPAC Recommendations 2013)", Pure and Applied Chemistry. 85 (8): 1715. doi:10.1351/PAC-REC-12-11-2, the disclosure of which is incorporated herein by reference in its entirety.

A wide variety of metals can be included in a metal organic framework. In some embodiments, the metal organic framework comprises a transition metal, including but not limited to any of the transition metals described above with respect to transition metal oxide adsorbents. In some embodiments, the metal used in the metal organic framework has catalytic activity for removal of catalyst poisons or for decomposition of ozone (e.g., Mn, Cu). In some embodiments, the MOF can include specific basic sites or metal oxide sites known to react with $SO_2$. Examples of specific metal organic framework materials include $Zn_4O_{13}C_{54}H_{24}$, $CuO_4C_6H_2$, UiO-66-$NH_2$ ({Zr(bdc-$NH_2$)$_2$} with (bdc-$NH_2$)=2-amino-1,4-benzenedicarboxylate)). MOF's can be synthesized by hydrothermal or solvothermal techniques, where crystals are slowly grown from a hot solution. Templating for the MOF structure can be provided by a secondary building unit (SBU) and the organic ligands. Alternate synthesis techniques are also available, such as chemical vapor deposition, in which metal oxide precursor layers are deposited followed by exposure of the precursor layers to sublimed ligand molecules to impart a phase transformation to the MOF crystal lattice. Other materials can also be included in the adsorbent material or adsorbent module, such as other (non-transition metal) adsorbents (e.g., activated carbon), which can be used as a support for the transition metal oxide, or can be incorporated as a stand-alone component or as part of a composite material along with the transition metal oxide.

Similar to the transition metal oxide adsorbents, MOF adsorbents can be disposed on a support such as a ceramic monolith or fibers. Both types of adsorbents can, in some embodiments, provide technical effects such as catalytic removal of ozone to supplement the functionality of the downstream noble metal catalyst. MOF adsorbents can also provide regeneration capability, and in some embodiments, the method includes regenerating the adsorbent by application of heat (e.g., temperatures of at least 60° C.) along with a purge gas flow through the adsorbent module 14 that bypasses the catalyst module 18.

In some embodiments, the adsorbent material can have one or more physical parameters that promote adsorption of catalyst poisons, and optionally promote catalytic activity of the adsorbent material. In some embodiments, the adsorbent can have a BET surface area in a range having a lower endpoint of 40 $m^2/g$, more specifically 50 $m^2/g$, even more specifically 60 $m^2/g$, and an upper even more specifically 200 $m^2/g$, or an upper endpoint for MOF's of 1500 $m^2/g$, more specifically 1200 $m^2/g$, and even more specifically 1100 $m^2/g$, or an upper endpoint for transition metal oxides of 300 $m^2/g$ and more specifically 200 $m^2/g$. Any of the above lower and upper range endpoints can be combined to disclose a variety of different ranges. In some embodiments, the adsorbent can have an average pore size in a range having a lower endpoint of 1 nm and an upper endpoint of 3 nm, and a pore volume of less than or equal to 0.2 $cm^3/g$.

With continued reference to FIG. 1, a treated gas 16 exits the adsorbent module 14 and is directed to a catalyst module 18. Catalyst module 18 catalytically decomposes ozone in the treated gas 16, and discharges an ozone-depleted treated gas 19. It should be noted that although FIG. 1 depicts the adsorbent module 14 and the catalyst module 18 as separate components, the modules can be integrated into a single device with a fluid flow path that contacts an adsorbent material and is then directed to a catalyst material. Similarly, although FIG. 1 depicts fluid flow moving directly from the adsorbent module 14 to the catalyst module 18, one or more fluid process devices or functionalities can be interposed between the adsorbent module 14 and the catalyst module 18. The catalyst module 18 comprises a noble metal catalyst. As used herein, the term "noble metal" means a metal selected from ruthenium, rhodium, palladium, iridium, platinum, gold, or combinations comprising any of the foregoing. In some embodiments, the noble metal is selected from palladium or platinum and their alloys. The noble metal can be dispersed in an oxide support such as $Al_2O_3$, $ZrO_2$, $TiO_2$ and $SiO_2$, and the catalyst (noble metal and oxide support) can be disposed on a carbon or ceramic substrate such as a honeycomb, corrugated sheet, fiber or other monolith structure. Ceramics for substrates can include but are not limited to sillimanite, petalite, cordierite, mullite, Zircon, Zircon mullite, spodumene, alumina, alumina-titanate, etc. Non-noble metal materials such as nickel, manganese, cobalt, copper, etc. (or oxides thereof) can also be included in the catalyst module, for example to provide additional catalytic decomposition of ozone at moderate temperatures.

Figure 2:
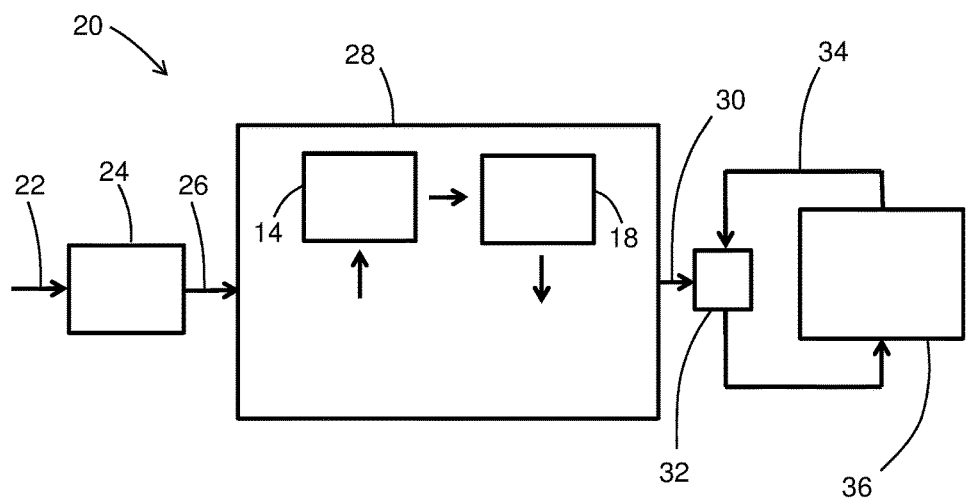
FIG. 2 is a schematic depiction of an example embodiment of an aircraft ozone removal system.

As mentioned above, a notable application for catalytic decomposition of ozone is treatment of cabin air for pressurized aircraft. An example embodiment of an aircraft cabin air ozone removal system is schematically depicted in FIG. 2. As shown in FIG. 2, aircraft cabin air system 20 receives outside ambient air 22 and directs it to a compressor 24. The compressor 24 can be a compressor section of a turbo-compressor aircraft engine, or can be an electrically-powered compressor. The compressor 24 compresses the air to a pressure of at least 15 psia, and typically to a greater pressure, which is then reduced by an aircraft ECS. In some embodiments, a turbo-compressor aircraft engine can provide bleed flow at 40-60 psi, whereas an electrically-powered compressor on a bleed-less or low-bleed aircraft architecture may provide compressed air at lower pressures (e.g., about 20 psi). The compressor 24 produces compressed air 26, which is directed to an ECS pack 28. As depicted in the example embodiment of FIG. 2, the ECS pack 28 includes an integrated adsorbent module 14 and an integrated catalyst module 18.

The ECS pack can also include other customary components for air cycle cooling systems, including heat exchangers, compressors (e.g., turbine-blade compressors), turbines, and heat exchanger/water removal units. Air cycle cooling systems can be based on three-wheel architecture (a fan, a compressor, and a turbine) or four-wheel architecture (a fan, a compressor, and two turbines). In some embodiments, the ECS pack cools bleed air in a ram air heat exchanger, partially re-compresses it in a turbine-powered compressor, cools the partially re-compressed air in a second pass through the ram air heat exchanger, expands and further cools the air flow and removes water with a turbine in a flow loop with a heat exchanger water removal unit, and, in the case of a four-wheel architecture further expands and cools the air in a second turbine. The location of the adsorbent module 14 and catalyst module 18 in flow paths through the ECS pack can vary depending on the system operating parameters of the ECS pack, and the temperature and other environmental requirements for effective adsorptive and catalytic effect. In some embodiments, the modules 14/18 can be disposed in the ECS airflow pathways with a direct flow from the adsorbent module 14 to the catalyst module 18. In some embodiments, the modules 14/18 can be integrated into a single device disposed in an airflow path in the ECS 28. In some embodiments, the modules 14/18 can be disposed in ECS airflow pathways with ECS components between the modules so that the catalyst module 18 is contacted with air at a different pressure, a different temperature, or a different pressure and temperature than air at the adsorbent module 14. By way of non-limiting example, catalytic transition metal oxides such as manganese oxide or others mentioned above can provide significant catalytic activity in the temperature range of 20-150° C., and in some embodiments such adsorbents are disposed in an airflow path in that temperature range. Noble metal catalysts can provide significant catalytic activity in the temperature range of 50-350° C., and in some embodiments the noble metal catalyst is disposed in an airflow path in that temperature range.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An aircraft cabin air system, comprising
a compressor that receives and compresses outside air;
a first air treatment module comprising an inlet in fluid communication with the compressor, an adsorbent comprising a metal organic framework, and an outlet;
a second air treatment module comprising an inlet in fluid communication with the first air treatment module outlet, an outlet that discharges ozone-depleted air, an air flow path between the inlet and outlet at a temperature of 50-350° C., and a noble metal catalyst in fluid communication with the air flow path; and
a thermal connection between the metal organic framework and a heat source for regenerating the adsorbent.

2. The system of claim 1, wherein the adsorbent comprises a transition metal oxide.

3. The system of claim 2, wherein the transition metal oxide comprises an oxide of manganese, copper, cobalt, magnesium, nickel, or combinations comprising any of the foregoing.

4. The system of claim 1, wherein the adsorbent comprises a metal organic framework.

5. The system of claim 4, wherein the metal organic framework comprises a transition metal or transition metal oxide.

6. The system of claim 5, wherein the metal organic framework comprises a transition metal or oxide of a transition metal selected from manganese, copper, nickel, cobalt, magnesium, aluminum, titanium, chromium, molybdenum, or combinations comprising any of the foregoing.

7. The system of claim 1, wherein the thermal connection utilizes waste heat from an on-board heat-generating component.

* * * * *